(12) United States Patent
Kühn et al.

(10) Patent No.: US 7,082,790 B2
(45) Date of Patent: Aug. 1, 2006

(54) QUARTZ GLASS BLANK FOR AN OPTICAL COMPONENT, AND MANUFACTURING PROCEDURE AND USE THEREOF

(75) Inventors: Bodo Kühn, Hanau (DE); Bruno Uebbing, Alzenau (DE); Martin Trommer, Schlüchtern (DE); Stefan Ochs, Bad Camberg (DE); Gero Fischer, Kleinwallstadt (DE); Ulla Holst, Stuttgart (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 412 days.

(21) Appl. No.: 10/310,279

(22) Filed: Dec. 5, 2002

(65) Prior Publication Data

US 2003/0115904 A1  Jun. 26, 2003

(30) Foreign Application Priority Data

Dec. 6, 2001 (DE) ............................... 101 59 962

(51) Int. Cl.
*C03B 8/04* (2006.01)
(52) U.S. Cl. ........................... 65/17.4; 65/17.6; 501/54
(58) Field of Classification Search ................. 65/17.4, 65/17.5, 17.6; 501/54
See application file for complete search history.

(56) References Cited

U.S. PATENT DOCUMENTS

| | | | |
|---|---|---|---|
| 5,086,352 A * | 2/1992 | Yamagata et al. ........... | 359/350 |
| 5,326,729 A | 7/1994 | Yaba et al. | |
| 5,364,433 A * | 11/1994 | Nishimura et al. ........... | 65/17.4 |
| 5,443,607 A * | 8/1995 | Englisch et al. ............... | 65/64 |
| 5,668,067 A * | 9/1997 | Araujo et al. .................. | 501/54 |
| 5,908,482 A | 6/1999 | Komine et al. | |
| 6,415,630 B1 * | 7/2002 | Coriand et al. ................ | 65/57 |

FOREIGN PATENT DOCUMENTS

| | | |
|---|---|---|
| EP | 0 401 845 A2 | 12/1990 |
| EP | 0 546 196 A1 | 6/1993 |
| EP | 0 673 888 A1 | 9/1995 |
| EP | 0673 888 A1 | 9/1995 |
| EP | 0 720 970 A1 | 7/1996 |
| EP | 1 061 052 A1 | 12/2000 |
| WO | WO 98/52879 | 11/1998 |
| WO | WO 99/38814 A | 8/1999 |

OTHER PUBLICATIONS

C.K. Van Peski, R. Morton, Z. Bor, "Behavior of Fused Silica Irradiated by Low Level 193 nm Excimer Laser for Tens of Billions of Pulses", Journal of Non-Crystalline Solids 265 (2000) pp. 285-289.

D.M. Dodd and D.B. Fraser, "Optical Determinations of OH in Fused Silica", J. Appl. Physics, May 25, 1966, p. 3911.
Transverse Zeeman Laser "Measurement of the Residual Birefringence Distribution in Glass Laser Disk", Electronics and Communications in Japan, Part 2, vol. 74, No. 5, 1991, pp. 21-28.
V.S. Khotimchenko, G.M. Sochivkin, I.I Novak, "Determining the Content of Hydrogen Dissolved in Quartz Glass Using the Methods of Raman Scattering and Mass Spectrometry", J. Appl. Spectrose. 46 (6), pp. 632-635 (1987).
Patent Abstracts of Japan, vol. 018, No. 219, Apr. 20, 1994.
American Chemical Society, "Chemical Abstracts & Indexes", Columbus, Ohio, 118 (1993) No. 20, May 17.

* cited by examiner

*Primary Examiner*—Sean Vincent
(74) *Attorney, Agent, or Firm*—Tiajoloff & Kelly (57) ABSTRACT

The present invention relates to a quartz glass blank for an optical component for transmission of ultraviolet radiation of a wavelength of 250 nm or shorter, and to a use of the quartz glass blank in microlithography in combination with ultraviolet radiation of a wavelength of 250 nm or shorter. Moreover, the invention relates to a procedure for manufacture of the quartz glass blank. A quartz glass blank of the described type should show little induced absorption and be optimized with respect to compaction and decompaction. The quartz glass blank according to the invention is characterized by the following properties:
a glass structure essentially free of oxygen defect sites,
an $H_2$-content in the range of $0.1 \times 10^{16}$ molecules/cm$^3$ to $4.0 \times 10^{16}$ molecules/cm$^3$,
an OH-content in the range of 125 wt-ppm to 450 wt-ppm,
an SiH group-content of less than $5 \times 10^{16}$ molecules/cm$^3$,
a refractive index inhomogeneity, $\Delta n$, of less than 2 ppm, and
a stress birefringence of less than 2 nm/cm.

In the use according to the invention, the quartz glass blank complies with dimensioning rules (2), (3), and (4) in terms of its OH-content, minimal and maximal hydrogen contents, $C_{OH}$, $C_{H2min}$, and $C_{H2max}$, respectively, with P being the pulse number and $\epsilon$ being the energy density:

$$C_{OH} \text{ [wt-ppm]} = 1{,}700 \times \epsilon \text{[mJ/cm}^2\text{]}^{0.4} \pm 50, \quad (2)$$

$$C_{H2min} \text{ [molecules/cm}^3\text{]} = 1 \times 10^6 \epsilon^2 P, \quad (3)$$

$$C_{H2max} \text{ [molecules/cm}^3\text{]} = 2 \times 10^{18} \epsilon. \quad (4)$$

The procedure according to the invention is characterized in that a mixed quartz glass is generated from a first and a second quartz glass by mixing the two quartz glasses.

15 Claims, 2 Drawing Sheets

QUARTZ GLASS BLANK FOR AN OPTICAL COMPONENT, AND MANUFACTURING PROCEDURE AND USE THEREOF

The present invention relates to a quartz glass blank for an optical component for transmission of ultraviolet radiation of a wavelength of 250 nm or shorter.

Moreover, the invention relates to a procedure for manufacture of a quartz glass blank as described, comprising the manufacture of a first and a second quartz glass by flame hydrolysis of a Si-containing compound, wherein the first and the second quartz glass differ in their OH-contents.

Moreover, the invention relates to a use for a quartz glass blank in the manufacture of a component for use in microlithography in combination with ultraviolet radiation of a wavelength of 250 nm or shorter.

Optical components made of quartz glass are used in particular for transmission of high energy ultraviolet laser radiation, for example in the form of optical fibers or as illumination optical components in microlithography devices they are used in the manufacture of highly-integrated circuits in semiconductor chips. The illumination systems of modern microlithography devices are equipped with excimer lasers that generate high energy pulsed UV radiation of a wavelength of 248 nm (KrF laser) or 193 nm (ArF laser).

Short-wavelength UV radiation may induce defects in optical components made of synthetic quartz glass leading to absorption effects. Aside from the conditions of irradiation, the type and extent of defect generation and the thus induced absorption effect depend on the quality of the quartz glass used, which is mainly a function of its structural properties, such as density, refractive index profile and homogeneity as well as the chemical composition.

The relationship between the irradiation conditions and material-specific factors on one hand and the induced absorption, $\alpha_{in}$, on the other can be expressed by the following modeling equation:

$$\alpha_{in} = a \times \epsilon^b \times P \quad (1)$$

in which a and b are material-specific factors, and $\epsilon$ and P represent the energy density and pulse number, respectively.

Therefore, the number of structural defects that are induced, and thus the absorption induced by these defects, depend on the number of impacting laser pulses, the energy density of these pulses, and material-specific factors.

The influence of the chemical composition of the quartz glass on the damage behavior upon irradiation with high energy UV light has been described before, e.g. in EP-A1 401 845. According to this source, a high degree of resistance to radiation damage is attained in a quartz glass characterized by a high degree of purity, an OH content between 100 and approx. 1,000 wt-ppm, and a relatively high hydrogen concentration of no less than $5 \times 10^{16}$ molecules per $cm^3$ (relative to the volume of the quartz glass). Moreover, the known synthetic quartz glass has a strain birefringence of less than 5 nm/cm and is nearly free of oxygen defect sites.

EP-A1 401 845 also describes procedures for manufacture of synthetic quartz glass by means of flame hydrolysis of silicon-containing compounds. Characteristic factors of these procedure are the starting substances and the type of vitrification of the deposited $SiO_2$ particles. $SiCl_4$ is a common starting substance for the manufacture of synthetic quartz glass by means of flame hydrolysis. However, other substances are also in common use, e.g. chlorine-free silicon-containing organic compounds, such as silanes or siloxanes. In any case, the procedure involves the deposition of layers of $SiO_2$ particles on a rotating substrate. If the surface temperature of the substrate is sufficiently high, the $SiO_2$ particles are directly vitrified upon deposition ("direct vitrification"). In contrast, in the so-called "soot procedure" the temperature is kept sufficiently low during the deposition of $SiO_2$ particles for a porous soot body to be formed, in which the $SiO_2$ particles are vitrified either not at all or only to a small degree. Vitrification under formation of quartz glass is attained in the soot procedure by subsequent sintering of the soot body. Both manufacturing procedures referred to above lead to the production of dense and transparent quartz glass of high purity. The production costs of the soot procedure are lower as compared to the direct vitrification procedure.

Usually, the blank is subjected to a tempering step in order to reduce mechanical stresses and attain a homogeneous distribution of the virtual temperature. EP-A1 401 845 proposes a tempering program, in which the blank is subjected to a temperature of approx. 1,100° C. for 50 hours and subsequently cooled down slowly to 900° C. at a cooling rate of 2° C./h, and finally allowed to cool to room temperature inside the closed furnace. In the proposed temperature regimen, the diffusion of components—in particular hydrogen—from the blank may cause local changes in chemical composition and formation of a concentration gradient between superficial areas and more internal areas of the blank. Therefore, in order to utilize the beneficial defect-healing properties of hydrogen for improvement of the radiation resistance of the quartz glass, EP-A1 401 845 recommends subsequent hydrogen treatment of the quartz glass blank at elevated temperature in a hydrogen-containing atmosphere.

The literature contains a number of reports on different damage patterns causing the absorption to increase upon long-lasting exposure to UV radiation. For instance, the induced absorption may increase linearly or show saturation after an initial increase. Another finding is that an absorption band observed initially disappears within several minutes after laser deactivation only to quickly reappear at the previous levels upon reactivation of the laser. This behavior has been termed "rapid damage process" (RDP) and is based on hydrogen molecules saturating the network defect sites in the quartz glass, though the bonding strength at the defect sites is low such that the bonds break once the component is reexposed to radiation. In another known damage pattern, structural defects appear to accumulate such that they culminate in a sudden strong increase in absorption. The strong increase in absorption in the latter damage behavior has been termed "SAT effect" in the literature.

The quartz glass known from EP-A1 401 845 responds to the exposure to UV irradiation with a relatively small increase in absorption only and consequently, this quartz glass is characterized by its high degree of resistance to short-wavelength UV radiation. However, aside from the induction of absorption or reduced transmission there may be other damage mechanisms leading for instance to the generation of fluorescence or changes in refractive index.

A known phenomenon in this context is the so-called process of "compaction" which occurs during or after exposure to laser light of high energy density. This effect leads to a local increase in density and ensuing increase in refractive index and thus causes deterioration of the optical properties of the optical component.

However, the opposite effect may also occur, i.e. when an optical quartz glass component is exposed to laser light of low energy density but high pulse number. "Decompaction"

has been observed under these conditions (also called "rarefaction" in the literature) accompanied by an ensuing decrease in refractive index. This effect also causes the optical properties to deteriorate. This has been reported in the literature by C. K. Van Peski, R. Morton, and Z. Bor ("Behaviour of fused silica irradiated by low level 193 nm excimer laser for tens of billions of pulses", J. Non-Cryst. Solids 265 (2000), p. 285–289).

Thus, compaction and decompaction are defects that do not necessarily cause an increase in radiation-induced absorption, but rather may limit the serviceable life of an optical component.

It is therefore the task of the present invention to provide a synthetic quartz glass blank for an optical component for transmission of ultraviolet radiation of a wavelength of 250 nm or shorter that shows a low degree of induced absorption and at the same time is optimized with respect to its compaction and decompaction properties. It is also a task of the present invention to provide a cost-effective procedure for manufacture of an optical component of the type described above, and a suitable use for such component.

With respect to the blank to be provided, this task is solved in the present invention by an embodiment of the blank with the following combination of properties:

glass structure that is essentially free of oxygen defect sites, $H_2$-content in the range of $0.1 \times 10^{16}$ molecules/cm$^3$ to $4.0 \times 10^{16}$ molecules/cm$^3$, OH-content in the range of 125 wt-ppm to 450 wt-ppm, SiH group-content of less than $5 \times 10^{16}$ molecules/cm$^3$, refractive index inhomogeneity, $\Delta n$, of less than 2 ppm, and stress birefringence of less than 2 nm/cm.

In this context, the glass structure being essentially free of oxygen defect sites shall mean a glass structure, in which the concentration of oxygen depletion defects and oxygen excess defects is below the detection limit of the method of Shelby. This detection method has been published: "Reaction of hydrogen with hydroxyl-free vitreous silica" (J. Appl. Phys., Vol. 51, No. 5 (May 1980), p. 2589–2593). In quantitative terms, this means that there are no more than approx. $10^{17}$ oxygen depletion defects and oxygen excess defects within the glass structure per gram of quartz glass.

Under ideal conditions, the stated ingredients and parameters are distributed homogeneously across the volume of the optical component. The concentrations stated above refer to the irradiated volume of the optical component. The OH-content is determined by measuring the IR absorption according to the method of D. M. Dodd et al. ("Optical determinations of OH in fused silica", J. Appl. Physics (1966), p. 3911). The $H_2$-content is determined by a Raman method first proposed by Khotimchenko et al. ("Determining the content of hydrogen dissolved in quartz glass using the methods of Raman scattering and mass spectrometry", Zhurnal Prikladnoi Spektroskopii, Vol. 46, No. 6 (June 1987), p. 987–991). The content of SiH groups is determined by means of Raman spectroscopy using the following chemical reaction for calibration: Si—O—Si+$H_2$→Si—H+ Si—OH, as described by Shelby ("Reaction of hydrogen with hydroxyl-free vitreous silica", J. Appl. Phys., Vol. 51, No. 5 (May 1980), p. 2589–2593).

The inhomogeneity of the refractive index, $\Delta n$, is determined by interferometry at a wavelength of 633 nm (He-Ne laser) with $\Delta n$ being the difference between the maximal value and the minimal value of the refractive index distribution measured across the section of the optical component used for transmission, which is also called "clear aperture" area (CA area). The clear aperture area is determined by projection of the transmitting volume onto a plane perpendicular to the direction of transmission.

The stress birefringence is determined by interferometry at a wavelength of 633 nm (He—Ne laser) according to the method described in "Measurement of the residual birefringence distribution in glass laser disk by transverse Zeeman laser" (Electronics and Communications in Japan, Part 2, Vol. 74, No. 5, 1991; translated from Denshi Joho Tsushin Gakkai Ronbunshi Vol. 73-C-I, No. 10, 1990, p. 652–657).

In contrast to the quartz glass qualities described in the literature to date, which mainly focus on a high degree of resistance to short-wavelength UV radiation, the quartz glass material of which the blank according to the present invention is made is characterized by a comparatively low hydrogen content and medium-level OH-content. A quartz glass displaying these properties is not readily available from either the "soot procedure" described above or the "direct vitrification" procedure. Usually, direct vitrification generates quartz glass with an OH-content of 450 to 1,200 wt-ppm and $H_2$-content of approx. $1 \times 10^{18}$ molecules/cm$^3$, while the manufacture of quartz glass according to the soot procedure results in qualities which typically have low OH-contents between several wt-ppm and 200 wt-ppm and $H_2$-contents below the detection limit.

It has been shown that the damage mechanisms leading to compaction and decompaction are either abolished or at least drastically reduced in an optical component made from a quartz glass blank with the properties described above. Moreover, changes in refractive index during the appropriate use of components of this kind are either completely abolished or largely avoided to the effect that the described damage mechanisms do not limit the serviceable life of optical components manufactured from blanks according to the present invention.

This effect of the above-mentioned combination of properties on the susceptibility to short-wavelength UV radiation damage has been demonstrated empirically, which shall be illustrated in detail in the following. The experiments also showed that low OH-contents of below 125 wt-ppm, i.e. typical OH-contents of quartz glass manufactured according to the soot procedure, lead to compaction, whereas quartz glass qualities with higher OH-contents above 450 wt-ppm show an enhanced decompaction tendency.

The damage mechanism leading to RDP is most pronounced at $H_2$-contents in excess of $4.0 \times 10^{16}$ molecules/cm$^3$, provided the OH-content is low (<450 wt-ppm). In addition, this type of quartz glass shows an enhanced decompaction tendency, while at an $H_2$-content below $0.1 \times 10^{16}$ molecules/cm$^3$ the defect-healing effect of hydrogen (described above) is so small that there are non-tolerable losses in transmission during the appropriate use of the optical component.

In contrast, the blank according to the present invention is optimized with respect to both compaction and decompaction and shows little induced absorption of short-wavelength UV radiation. This optimization facilitates the use of quartz glass manufactured according to the soot procedure even in optical components with stringent requirements with regard to the homogeneity of their optical properties.

It has proven especially beneficial to have the OH-content of the blank be in the range of 200 wt-ppm to 350 wt-ppm, as this OH-content represents a preferred compromise between decompaction and compaction on the one hand and the rapid damage process on the other.

Advantageously, the $H_2$-content is in the range of $1 \times 10^{16}$ molecules/cm$^3$ to $3 \times 10^{16}$ molecules/cm$^3$. A quartz glass blank with an $H_2$-content within the stated range provides not only the beneficial defect-healing effect of hydrogen at a particularly high level, but also affords extensive prevention of decompaction. In addition, this optimization provides for the use of quartz glass manufactured according to the soot procedure in applications, in which compaction and decompaction comprise critical effects limiting the serviceable life.

With regard to the procedure for manufacture of a quartz glass blank the task stated above is solved in the present invention on the basis of the procedure cited in the introduction by generating a mixed quartz glass with a mean OH-content in the range of 125 wt-ppm to 450 wt-ppm by mixing the first quartz glass and the second quartz glass.

It has been mentioned above that a quartz glass with the properties of the blank according to the invention listed above is not readily available from the "soot procedure" or "direct vitrification". The difficulty in these manufacturing procedures concerns mainly the establishment of a mean OH-content in the range of 125 wt-ppm to 450 wt-ppm. Establishment of an OH-content above approx. 300 wt-ppm is a problem in the soot procedure due to the formation of bubbles during soot body vitrification, whereas an OH-content below approx. 450 wt-ppm is practically impossible to establish by direct vitrification.

Thus, in the procedure according to the invention, the blank is obtained by mixing at least two quartz glass qualities with different OH-contents. These quartz glass qualities are obtained by application of the soot procedure and/or direct vitrification procedure. The first quartz glass has a lower OH-content as compared to the mean OH-content to be established, and the second quartz glass has a higher OH-content as compared to the mean OH-content to be established, and mixing of the two quartz glasses generates a mixed quartz glass, in which a mean OH-content between the OH-contents of the first quartz glass and the second quartz glass is established according to the existing mass ratio of the first quartz glass with respect to the second quartz glass. This procedure provides for the cost-effective manufacture of a mixed quartz glass with an OH-content in the range of 125 wt-ppm to 450 wt-ppm.

The first and second quartz glasses are mixed either by softening the glasses and subsequent homogenization in a mould, or by twisting around each other the form bodies made of the different quartz glass qualities, and subsequent homogenization by turning. The homogenization of quartz glass of a single quality by twisting and turning is described in DE 42 04 406 C2 and EP-A1 673 888.

The mixing of the quartz glass qualities also provides for the establishment of corresponding mean concentrations of the other ingredients of the blank according to the invention—this concerns especially the contents of $H_2$ and SiH groups.

The resulting properties of the mixed quartz glass correspond to those of the blank according to the invention; for details the reader is referred to the explanations provided above.

In an especially preferred procedure, the manufacture of the first quartz glass with a first OH-content involves the formation of $SiO_2$ particles and deposition of layers of these $SiO_2$ particles on a rotating carrier under generation of a porous soot body and subsequent vitrification of the soot body, and the manufacture of the second quartz glass with a different OH-content as compared to the first quartz glass involves the formation of $SiO_2$ particles and deposition of these $SiO_2$ particles on a rotating carrier under generation of a vitrified preform. The first quartz glass is a quartz glass made by the soot procedure, whereas the second quartz glass is a quartz glass made by the direct vitrification procedure. These quartz glass qualities are particularly suitable for the establishment of a mean OH-content according to the present invention. To prevent the formation of bubbles during vitrification of the soot bodies manufactured according to the soot procedure, it is essential to establish the OH-content at a level of max. 300 wt-ppm. For this purpose, the soot bodies are commonly subjected to a dehydration treatment in a dry atmosphere, which allows the OH-content to be reduced down to just a few ppm. Following vitrification and subsequent homogenization, the $H_2$-content of quartz glass manufactured according to the soot procedure usually is below the detection limit. In contrast, quartz glasses manufactured by flame hydrolysis in accordance with the direct vitrification procedure usually have a relatively high OH-content of several hundred wt-ppm and a high $H_2$-content in excess of $10^{17}$ molecules/cm$^3$ due to details of the procedure. By mixing the appropriate quantities of these two quartz glass qualities, a mixed quartz glass, optimized with respect to the $H_2$-content to be established, but preferably optimized with respect to the OH-content, can be obtained in a cost-effective procedure.

Especially with regard to the typical differences in the chemical compositions of quartz glasses manufactured by the soot procedure versus direct vitrification procedure, as illustrated above, a procedure is preferred, in which the first quartz glass has an OH-content in the range of 10 wt-ppm to 300 wt-ppm and the second quartz glass has an OH-content in the range of 400 wt-ppm to 1,300 wt-ppm.

In this regard, it has proven especially advantageous to mix the quartz glass qualities by twisting one quartz glass body of the first quartz glass around one quartz glass body of the second quartz glass, and subsequent turning of the arrangement obtained. In the simplest case scenario, the quartz glass bodies consist of elongated cylinders (tubes and/or rods) that become softened in a first step of the procedure while being in a parallel arrangement adjacent to each other, and twisted around each other around a rotation axis extending parallel to the longitudinal axis. Any striae remaining in a plane perpendicular to the rotation axis are then removed by turning the arrangement once or several times.

With regard to the use of the quartz glass blank, the task specified above is solved in the present invention in that, for an use with ultraviolet radiation of a wavelength of 250 nm or shorter at a given pulse energy density $\epsilon$ of at least 0.005 mJ/cm$^2$, a quartz glass with an OH-content, $C_{OH}$, is selected, in which $C_{OH}$ complies with the following dimensioning rule:

$$C_{OH} \text{ [wt-ppm]} = 1,700 \times \epsilon^{0.4} \pm 50 \qquad (2)$$

Preferably, a quartz glass with an OH-content, $C_{OH}$, is selected, in which $C_{OH}$ complies with the following dimensioning rule:

$$C_{OH} \text{ [wt-ppm]} = 1,700 \times \epsilon^{0.4} 25.$$

In the ideal case, neither compaction nor decompaction occur. However, under practical conditions either compaction or decompaction are observed depending on the actual irradiation conditions and properties of the quartz glass. Surprisingly, a quartz glass whose OH-content complies with dimensioning rule (2) has been found to closely approximate the ideal case stated above, i.e. it shows neither obvious compaction nor substantial decompaction when exposed to UV radiation with a short wavelength of <250 nm at a pulse energy density, $\epsilon$, between 0.005 mJ/cm² and 0.1 mJ/cm².

For a pulse energy density near the stated lower limit of $\epsilon$=0.005 mJ/cm², a mean OH-content in the range of 154 wt-ppm to 254 wt-ppm, preferably in the range of 179 wt-ppm to 229 wt-ppm, is calculated with dimensioning rule (2).

Dimensioning rule (2) has proven especially useful in the definition of the OH-content to provide for both low compaction and low decompaction tendency at a pulse energy density of less than 0.1 mJ/cm², preferably of less than 0.05 mJ/cm².

For the upper limit of $\epsilon$=0.1 mJ/cm², an OH-content in the range of 626 wt-ppm to 726 wt-ppm is calculated with dimensioning rule (2).

An even better approximation to the ideal case is provided by selecting, at a given pulse number, P, a quartz glass with a minimal hydrogen content, $C_{H2min}$, and a maximal hydrogen content, $C_{H2max}$, both of which comply with the following dimensioning rules,:

$$C_{H2min} \text{ [molecules/cm}^3\text{]} = 1.0 \times 10^6 \epsilon^2 P \quad (3), \text{ and}$$

$$C_{H2max} \text{ [molecules/cm}^3\text{]} = 2.0 \times 10^{18} \epsilon \quad (4)$$

($\epsilon$=pulse energy density, in mJ/cm²).

Establishment of the hydrogen content in accordance with dimensioning rules (3) and (4) optimizes the quartz glass in terms of its short-wavelength UV radiation damage behavior. Dimensioning rule (3) defines a minimal hydrogen concentration as a function of the irradiation conditions (pulse energy density and pulse number), below which the defect-healing effect of hydrogen is so small that there are non-tolerable losses in transmission during the appropriate use of the optical component. In contrast, dimensioning rule (4) defines an upper limit for the hydrogen content as a function of the pulse energy density, above which an increase in RDP at lower OH-contents (<450 wt-ppm) or decompaction occurs. The stated hydrogen concentrations refer to the section of the quartz glass blank that is exposed to the highest radiation load in the optical component manufactured from the quartz glass blank. Usually, this section corresponds to the center of the component, i.e. the center of the quartz glass blank.

In the following, the invention is illustrated in detail by means of embodiments and one drawing. In the following.

Figure 1:
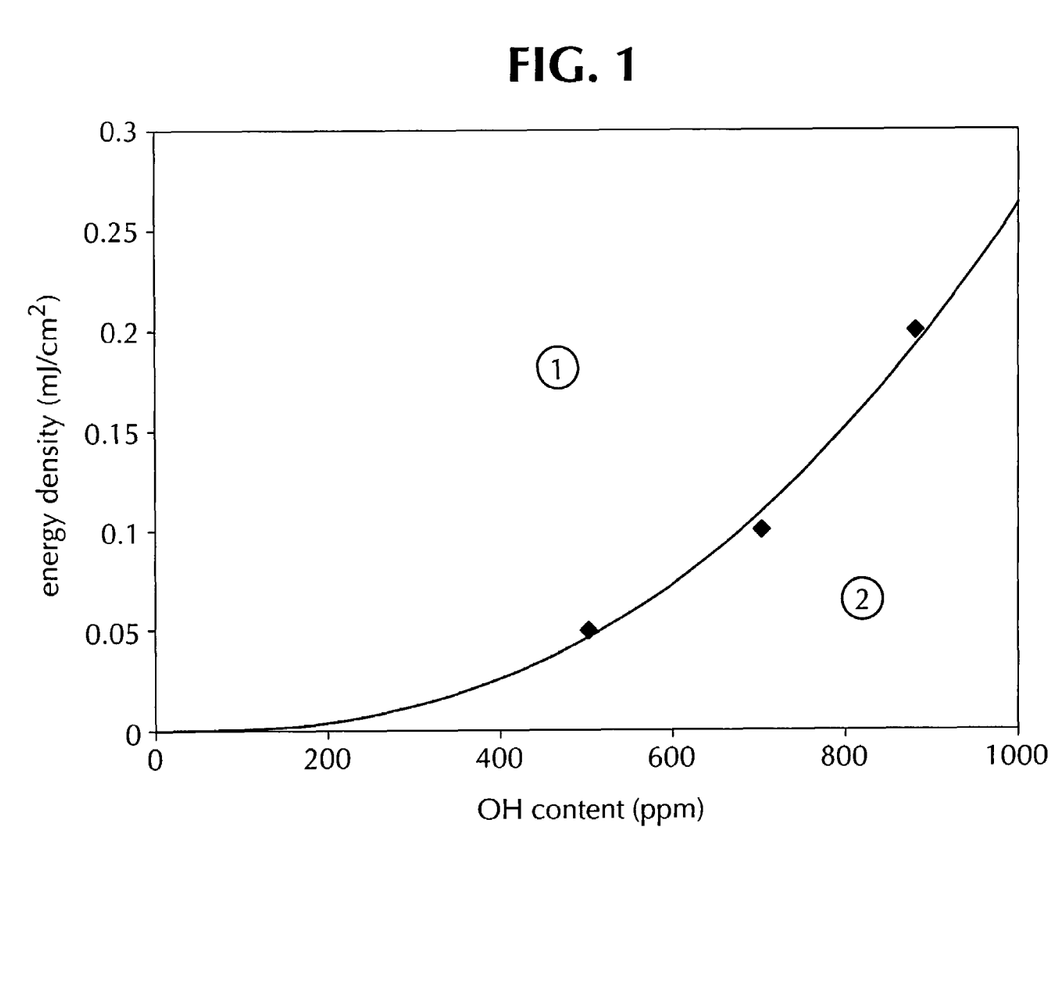
FIG. 1 shows a diagram illustrating the occurrence of compaction or decompaction as a function of the OH-content of the quartz glass and pulse energy density of the radiation.

The diagram in FIG. 1 shows the OH-content, $C_{OH}$, (in wt-ppm; denoted "OH content" in the figure) plotted against the pulse energy density, $\epsilon$ (in mJ/cm²; denoted "energy density" in the Figure). The curve shown is based on damage measurements performed on different quartz glass qualities differing in their OH-contents. The measurements are performed with laser light of a wavelength of 193 nm and a laser pulse length between 20 and 50 nanoseconds. The laser pulse length is determined according to the method described by V. Liberman, M. Rothschild, J. H. C. Sedlacek, R. S. Uttaro, A. Grenville in "Excimer-laser-induced densification of fused silica: laser-fluence and material-grade effects on scaling law", Journal Non-Cryst. Solids 244 (1999), p. 159–171.

The measuring points determined under the stated conditions are shown as diamonds. The curve is representative of the $C_{OH}/\epsilon$ data pairs showing neither compaction nor decompaction. Area (1) above the curve corresponds to the area of compaction, while area (2) below the curve corresponds to the area, in which decompaction is observed. The curve can be described in approximation by the following formula:

$$C_{OH} \text{ [wt-ppm]} = 1{,}700 \times \epsilon \text{[mJ/cm}^2\text{]}^{0.4}$$

Thus, both the curve and this equation can be used to select for any energy pulse density between 0 and 0.15 mJ/cm² the required OH-content of a quartz glass that is to show neither compaction nor decompaction.

Figure 2:
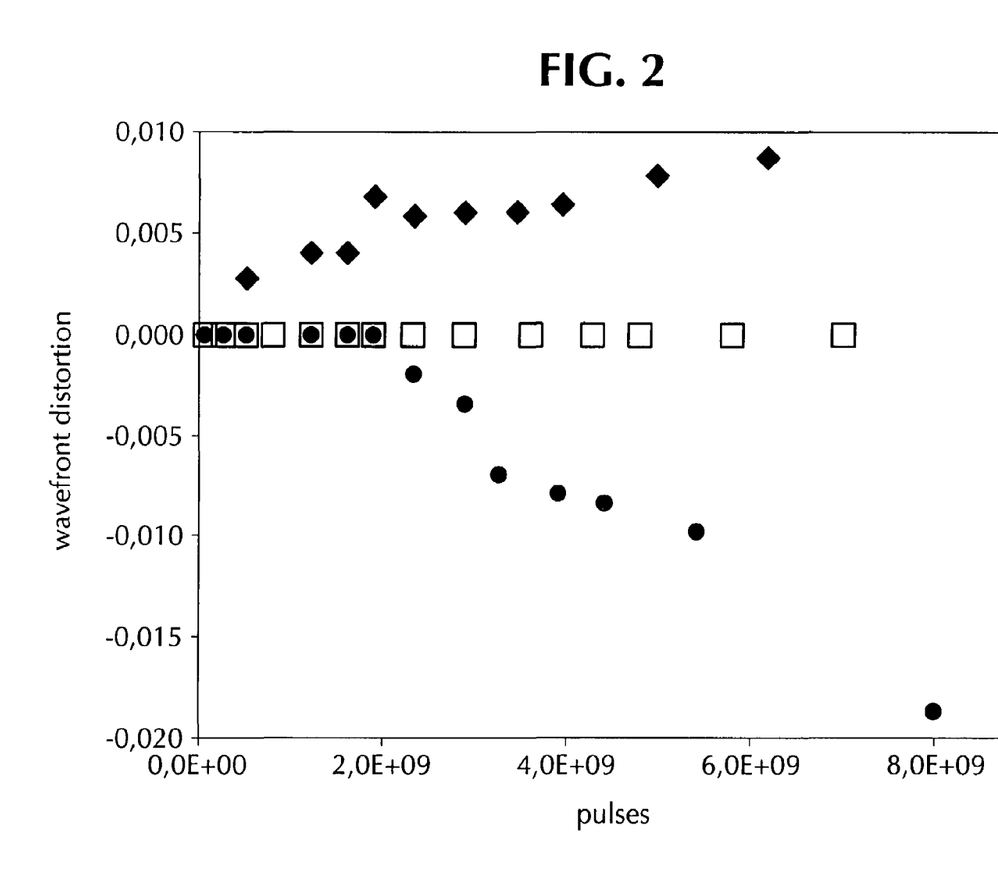
FIG. 2 shows a diagram illustrating the occurrence of compaction or decompaction as a function of the OH-content of the quartz glass and the pulse number at constant pulse energy density.

FIG. 2 is an illustration of the occurrence of compaction and decompaction as a function of pulse number (X-axis denoted "pulses" in the Figure) at a constant pulse energy density of 0.03 mJ/cm². The Y-axis shows the wavefront distortion in fractions of the wavelength of the incident light of a wavelength of 633 nm in this particular example. The wavefront distortion is a result of the incident, level wavefront being disturbed by spatial inhomogeneities of the refractive index. Thus, the wavefront distortion is a measure of the occurrence of compaction or decompaction.

The diamonds in FIG. 2 correspond to the experimental values measured on a quartz glass with an OH-content of 250 wt-ppm and $H_2$-content of $3 \times 10^{16}$ molecules/cm³. The process of compaction is evident.

The circles in FIG. 2 correspond to the experimental values measured on a quartz glass with an OH-content of 1,200 wt-ppm and $H_2$-content of $1 \times 10^{18}$ molecules/cm³. The process of decompaction is evident.

In the measurements on an optimized quartz glass, shown as open squares, neither compaction nor decompaction are evident. The OH-content of the quartz glass is 425 wt-ppm.

Examples of quartz glasses of these types and reference samples are listed in Table 1.

TABLE 1

| 1 No. | 2 OH-content [wt-ppm] | 3 $H_2$-content [molecules/cm³] | 4 SiH groups [molecules/cm³] | 5 O⁺ [g⁻¹] | 6 Δn [ppm] | 7 Λ [nm/cm] | 8 $\epsilon$ [mJ/cm³] | 9 Compaction | 10 De-compaction | 11 Induced Absorption |
|---|---|---|---|---|---|---|---|---|---|---|
| 1 | 250 | $<1 \times 10^{15}$ | $<5 \times 10^{16}$ | $<10^{17}$ | <2 | <2 | 0.01 | not determ. | not determ. | yes |
| 2 | 250 | $2 \times 10^{16}$ | $<5 \times 10^{16}$ | $<10^{17}$ | <2 | <2 | 0.01 | no | no | no |
| 2a | 250 | $3 \times 10^{16}$ | $<5 \times 10^{16}$ | $<10^{17}$ | <2 | <2 | 0.03 | yes | no | no |
| 3 | 250 | $1 \times 10^{17}$ | $5 \times 10^{16}$ | $<10^{17}$ | <2 | <2 | 0.01 | no | yes | yes |
| 4 | 1 | $<1 \times 10^{15}$ | $<5 \times 10^{16}$ | $>10^{17}$ | <2 | <2 | 0.01 | yes | no | yes |
| 5 | 900 | $2 \times 10^{16}$ | $<5 \times 10^{16}$ | $<10^{17}$ | <2 | <1 | 0.01 | no | yes | no |
| 6 | 600 | $2 \times 10^{16}$ | $<5 \times 10^{16}$ | $<10^{17}$ | <2 | <1 | 0.075 | no | no | no |

TABLE 1-continued

| 1 No. | 2 OH-content [wt-ppm] | 3 $H_2$-content [molecules/cm$^3$] | 4 SiH groups [molecules/cm$^3$] | 5 $0^\pm$ [g$^{-1}$] | 6 $\Delta n$ [ppm] | 7 $\Lambda$ [nm/cm] | 8 $\epsilon$ [mJ/cm$^3$] | 9 Compaction | 10 De-compaction | 11 Induced Absorption |
|---|---|---|---|---|---|---|---|---|---|---|
| 7 | 425 | $2 \times 10^{16}$ | $<5 \times 10^{16}$ | $<10^{17}$ | <2 | <1 | 0.03 | no | no | no |
| 8 | 425 | $2 \times 10^{16}$ | $<5 \times 10^{16}$ | $<10^{17}$ | <2 | <1 | 0.1 | yes | no | no |
| 9 | 425 | $2 \times 10^{16}$ | $<5 \times 10^{16}$ | $<10^{17}$ | <2 | <1 | 0.005 | no | yes | no |

Table 1 shows the results of radiation exposure measurements under various irradiation conditions obtained with quartz glass blanks differing in chemical composition. The three rightmost columns of the Table contain qualitative entries indicating the occurrence of compaction, decompaction or absorption in the individual blanks.

The properties listed in columns 2 through 7 are determined on cylinder-shaped quartz glass blanks with an external diameter of 240 mm and thickness of 60 mm. These samples are blanks for the manufacture of lenses for a microlithography device operating with excimer laser radiation of a wavelength of 193 nm. Except for a slight overmeasure, which is to later be removed during manufacture of the lens, the dimensions of the blanks correspond to the dimensions of the lenses. The quartz glass volume corresponding to the clear aperture area of the lens manufactured from the blank is determined by the circular area of the lens minus an edge of several millimeters taken up by the lens holder, and the thickness. The column, "$0^\pm$", of Table 1 indicates the concentration of oxygen defect sites, column, "$\Delta n$", the difference in refractive indices determined across the clear aperture area, and column, "$\Lambda$", the maximal birefringence in the clear aperture area.

For the irradiation experiments, rod-shaped samples of 25×25×200 mm$^3$ were obtained from the respective quartz glass blanks and identical procedures used to prepare the samples for the experiments (polishing of opposite 25×25 mm areas).

For investigation of the damage behavior of the samples in terms of compaction or decompaction, the samples were exposed to UV radiation of a wavelength of 193 nm under variation of the pulse energy density, as indicated in column 8 of Table 1. Five billion pulses (pulse number) were used in each of these experiments.

The column, "induced absorption", summarizes two damage mechanisms leading to an increase in absorption, i.e. "increase in linear absorption" and the rapid damage process described above. For investigation of the damage behavior of the samples with regard to induced absorption, the samples were also exposed to UV radiation of a wavelength of 193 nm at the pulse energy density stated in column 8. A total of 1 million pulses (pulse number) suffice to allow the determination of the RDP, whereas at least 1 billion pulses (pulse number) are required to determine the increase in linear absorption. This is done through a determination of the transmission loss of the sample by measuring the reduction in the intensity of the laser light after transmission through the sample.

Compaction and decompaction were determined after the irradiation experiments by measuring the relative increase or decrease in the refractive index of the irradiated area versus non-irradiated area using a commercial interferometer (Zygo GPI-XP) at a wavelength of 633 nm.

The procedures for manufacture of the quartz glass blanks, from which the investigated samples 1 through 9 originated, are described in an exemplary fashion in the following:

1. Blanks 1 Through 4

These quartz glasses are manufactured according to the soot procedure.

Manufacture of a Soot Body

Oxyhydrogen burners are used to deposit layers of $SiO_2$ particles on an aluminum oxide carrier tube with an external diameter of 40 mm to form a porous soot body. The oxyhydrogen burners are supplied with glass starting materials and combustion materials, which are converted to $SiO_2$ particles in the corresponding burner flame of each oxyhydrogen burner. During the deposition process, the burners are continually moved along the longitudinal axis and between two spatially-fixed reversal points in a predefined motion with an amplitude of 15 cm, upon which sequential $SiO_2$ layers are deposited on the carrier tube or the surface of the soot body thus formed until the soot body attains an outer diameter of approx. 300 mm.

After completion of the deposition procedure and removal of the carrier tube, the soot body thus obtained is subjected to a dehydration treatment in order to remove hydroxyl groups that were introduced due to technical details of the manufacturing procedure.

Dehydration Treatment of Blanks 1 through 3

For the purpose of dehydration, the soot tube is heat-treated in a vacuum chamber for approx. 8 hours at a temperature of approx. 900° C. This treatment establishes an essentially homogeneous hydroxyl group concentration (OH-content) of approx. 250 wt-ppm across the volume of the soot tube.

Dehydration Treatment of Blank 4

For the purpose of dehydration, the soot tube is introduced into a dehydration furnace in a vertical orientation, and subjected to an initial treatment in a chlorine-containing atmosphere at 900° C. The duration of treatment is approx. 8 hours. This heat treatment establishes the hydroxyl group concentration (OH-content) at a level of less than 10 wt-ppm.

Vitrification Process Used for Blanks 1 and 4

Subsequently, the treated soot tube is sintered at a temperature of approx. 1,400° C. in a vacuum vitrification furnace that is in a vertical orientation by feeding the soot tube into a ring-shaped heating zone, in which it is sequentially heated. After completion of the vitrification process, molecular hydrogen is no longer detectable (<1×10$^{15}$ molecules/cm$^3$) in the sintered (vitrified) quartz glass tube. The OH-content is in the range specified in Table 1.

Vitrification Process Used for Blanks 2 and 2a

After completion of the dehydration process, the treated soot tube is sintered at a temperature of approx. 1,400° C. in a vacuum vitrification furnace that is in a vertical orientation by feeding the soot tube into a ring-shaped heating zone, in which it is sequentially heated. During this step, a hydrogen-containing atmosphere is maintained inside the vitrification furnace with the partial pressure of hydrogen being 10 mbar. Following this treatment, the sintered (vitrified) quartz glass tube shows an inhomogeneous hydrogen profile across its wall in that the hydrogen concentration decreases in a radial fashion from its level at the outer surface of the tube and at the inner surface of the tube towards its level in the middle of the wall of the tube. The mean $H_2$-content across the thickness of the wall is approx. $4\times10^{16}$ molecules/cm$^3$ after this treatment. The OH-content is in the range specified in Table 1.

Vitrification Process Used for Blank 3

The treated soot tube of blank 3 is then sintered at a temperature of approx. 1,400° C. in a vacuum vitrification furnace that is in a vertical orientation by feeding the soot tube into a ring-shaped heating zone, in which it is sequentially heated. During this step, a hydrogen-containing atmosphere is maintained inside the vitrification furnace with the partial pressure of hydrogen being 150 mbar. Following this treatment, the sintered (vitrified) quartz glass tube shows an inhomogeneous hydrogen profile across its wall in that the hydrogen concentration decreases in a radial fashion from its level at the outer surface of the tube and at the inner surface of the tube towards its level in the middle of the wall of the tube. The mean $H_2$-content across the thickness of the wall is approx. $2\times10^{17}$ molecules/cm$^3$ after this treatment. The OH-content is in the range specified in Table 1.

Reshaping Process and Homogenization of Blanks 1 Through 4

The sintered (vitrified) quartz glass tube is converted into a massive cylinder with an outer diameter of 300 mm and length of 100 mm by reshaping and ensuing homogenization (twisting and turning). The blank is heated to 1,100° C. in a tempering step under an air atmosphere at atmospheric pressure and then cooled down at a cooling rate of 1° C./h. Subsequently, the overmeasure amounts are removed, i.e. 30 mm radial and 20 mm axial on both sides, in order to remove hydrogen concentration gradients formed as a result of the diffusion of hydrogen from the blank. The OH-content and hydrogen content of the blank correspond to the levels specified in Table 1. With the exception of blank 3, the concentration of SiH groups is less than $5\times10^{16}$ molecules/cm$^3$ (determined within the clear aperture area in all cases). The stress birefringence is measured to be less than 2 nm/cm and the refractive index distribution is sufficiently homogeneous for the difference between its maximal and minimal values to be less than $2\times10^{-6}$. The concentration of oxygen defect sites is determined to be less than $1\times10^{17}$ per g for blanks 1, 2, and 3, while blank 4 shows a higher concentration of oxygen defect sites.

The homogenization step then provides for an even distribution of the stated ingredients across the entire volume of the cylinder. This is of special importance with respect to the hydrogen contents of blanks 2 and 2a.

2. Blanks 5 and 6

These quartz glasses are manufactured according to the direct vitrification procedure.

Deposition Process

An oxyhydrogen burner is used to deposit fine $SiO_2$ particles on a disc-shaped substrate that rotates around its central axis. The $SiO_2$ particles are directly vitrified by the heat of the oxyhydrogen flame under formation of a rod-shaped quartz glass blank. The starting substances used render the quartz glass blank essentially free of chlorine (the chlorine content is below 1 wt-ppm). The hydrogen content at this step of the procedure is yet as high as $1\times10^{18}$ molecules/cm$^3$.

Measures for Adjustment of the OH-contents of Blanks 5 and 6

Table 1 shows that blanks 5 and 6 differ in one property only, i.e. their OH-content. The OH-content is adjusted to a defined level by adjusting the substrate temperature in the deposition process by increasing or decreasing the supply of hydrogen and oxygen to the oxyhydrogen burner. An increase in the temperature leads to a higher OH-content, whereas lower OH-contents are obtained by lowering the temperature.

Reshaping Process and Homogenization of Blanks 5 and 6

For the purpose of homogenization, the quartz glass blank is then clamped into a quartz glass turning lathe, heated sequentially to a temperature of approx. 2,000° C., and twisted in the process. A suitable homogenization procedure for this purpose is described in EP-A1 673 888. After repeated twisting, a quartz glass blank in the form of a round rod with a diameter of 80 mm and length of approx. 800 mm is provided that is free of striae in three directions of space. The round rod is then converted to a circular quartz glass cylinder with an outer diameter of 300 mm and length of 100 mm by heat reshaping at a temperature of 1,700° C. using a nitrogen-flushed casting mould. The quartz glass cylinder is heated to 1,100° C. in a tempering step under an air atmosphere at atmospheric pressure, kept at this temperature for approx. 100 h, and then cooled down at a cooling rate of 1° C./h. Subsequently, the overmeasure amounts are removed, i.e. 30 mm radial and 20 mm axial on both sides, in order to remove hydrogen concentration gradients formed as a result of the diffusion of hydrogen from the blank. The hydrogen content of the blank is approx. $2\times10^{16}$ molecules/cm$^3$ and the OH-content is approx. 900 wt-ppm (blank 5) or 600 wt-ppm (blank 6). The stress birefringence is measured to be less than max. 2 nm/cm and the refractive index distribution is sufficiently homogeneous for the difference between its maximal and minimal values to be less than $2\times10^{-6}$.

The quartz glass cylinder thus obtained also is suitable, without further processing, for use as a blank in the manufacture of an optical lens for a microlithography device.

3. Blanks 7 though 9

Blanks 7 through 9 consist of the same quartz glass. This quartz glass quality is obtained by mixing quartz glass produced according to the soot procedure and quartz glass generated according to the direct vitrification procedure.

For this purpose, a quartz glass rod made of the quartz glass of blank 2 and another quartz rod made of the quartz glass of blank 6 are manufactured separately and then mixed. The relative quantities of the two quartz glass qualities are selected such that, upon use of the mixed quartz glass in combination with UV radiation of a wavelength of 193 nm at a pulse energy of $\epsilon$=0.03 mJ/cm$^2$, the OH-content is established in compliance with the following dimensioning rule:

$$C_{OH}[\text{wt-ppm}]=1,700\times\epsilon^{0.4}(\epsilon \text{ in mJ/cm}^2)$$

Thus, at $\epsilon$=0.03 mJ/cm$^2$, the OH-content to be established in the mixed quartz glass is calculated with the dimensioning rule as approx. 425 wt-ppm (the exact calculation yields 418 wt-ppm).

Since the OH-contents of the quartz glasses of blank 2 and blank 6 are 250 wt-ppm and 600 wt-ppm, respectively, equal quantities of the two quartz glass qualities are required to adjust the OH-content of the mixed quartz glass to a level of 425 wt-ppm. The quartz glasses are provided in the form of one 8 kg-quartz glass rod each. For twisting of the two quartz glass rods around each other, the rods are first arranged such that their longitudinal surfaces are in direct contact, then the rods are heated to a temperature of approx. 2,000° C. and thus softened so that they can be rotated around a mutual rotation axis extending parallel to the longitudinal axes to generate the mixed quartz glass. Any remaining striae are subsequently removed by repeated twisting and turning as described in EP-A1 673 888.

A circular mixed quartz glass cylinder with an external diameter of 300 mm and length of 100 mm is then generated by a subsequent heat reshaping step at a temperature of 1,700° C. using a nitrogen-flushed casting mould. The quartz glass cylinder is heated to 1,100° C. in a tempering step under an air atmosphere at atmospheric pressure, kept at this temperature for approx. 50 h, and then cooled down at a cooling rate of 1° C./h. Subsequently, the overmeasure amounts are removed, i.e. 30 mm radial and 20 mm axial on both sides, in order to remove hydrogen concentration gradients formed as a result of the diffusion of hydrogen from the blank. The hydrogen content and OH-content of the blank are approx. $2 \times 10^{16}$ molecules/cm$^3$ and approx. 425 wt-ppm, respectively, which corresponds to the mean of the OH-contents of the original blanks, 2 and 6. The stress birefringence is measured to be less than max. 2 nm/cm and the refractive index distribution is sufficiently homogeneous for the difference between its maximal and minimal values to be less than $2 \times 10^6$.

The quartz glass block thus obtained also is suitable, without further processing, for use as a blank in the manufacture of an optical lens for a microlithography device.

Measures for Selection of the Upper and Lower Limits of the $H_2$-content

The selection of the upper and lower limits of the $H_2$-content is based on dimensioning rules (3) and (4) using the typical pulse energy density of 0.03 mJ/cm$^2$. The predefined $H_2$-content is established by tempering the blanks at 1,100° C. as described above, while accounting for the diffusion processes.

This results in an $H_2$-content of $1.4 \times 10^{18}$ molecules/cm$^3$, which, taking into account the diffusion during the tempering of the heat-reshaped lens blank (see above)($H_2$-loss through diffusion is approx. 30%), is within the limits, $C_{H2min}$ and $C_{H2max}$ specified by dimensioning rules (3) and (4) for $\epsilon = 0.03$ mJ/cm$^3$ as follows $C_{H2min}$ [molecules/cm$^3$]=$1.0 \times 10^6 \times (0.03)^2$ P $C_{H2max}$ [molecules/cm$^3$]=$2.0 \times 10^{18} \times (0.03)$ With $\epsilon = 0.03$ mJ/cm$^2$ and a maximal pulse number of $1 \times 10^{12}$, the minimal $H_2$-content and the maximal $H_2$-content to be established in the quartz glass are calculated as $9 \times 10^{14}$ molecules/cm$^3$ and $6 \times 10^{16}$ molecules/cm$^3$, respectively.

The predefined $H_2$-content is established by tempering the blanks at 1,100° C. as described above, while accounting for the diffusion processes.

For the purpose of homogenization, the quartz glass blank is then clamped into a quartz glass turning lathe, heated sequentially to a temperature of approx. 2,000° C., and twisted in the process. A suitable homogenization procedure for this purpose is described in EP-A1 673 888. After repeated twisting, a quartz glass blank in the form of a round rod with a diameter of 80 mm and length of approx. 800 mm is provided that is free of striae in three directions of space.

The round rod is then converted to a circular quartz glass cylinder with an outer diameter of 240 mm and length of 80 mm by heat reshaping at a temperature of 1,700° C. using a nitrogen-flushed casting mould. After an additional tempering step, in which the quartz glass cylinder is heated to 1,100° C. under an air atmosphere at atmospheric pressure and subsequently cooled to 900° C. at a cooling rate of 2° C./h, the stress birefringence is measured to be less than 2 nm/cm and the refractive index distribution is sufficiently homogeneous for the difference between its maximal and minimal values to be less than $2 \times 10^{-6}$. A rod-shaped sample of $25 \times 25 \times 200$ mm$^3$ with $H_2$- and OH-contents of approx. $2 \times 10^{16}$ molecules/cm$^3$ and approx. 425 wt-ppm, respectively, is obtained from the central portion of the blank.

Evaluation of the Results

With regard to the occurrence of compaction, decompaction, and induced absorption, the data listed in Table 1 show blanks 2 and 7 to yield the best results at energy densities of 0.01 and 0.03 mJ/cm$^2$, respectively. Blank 2a with its slightly higher $H_2$-content as compared to blank 2 shows compaction upon exposure to ultraviolet radiation with an energy density of 0.03 mJ/cm$^2$ (see FIG. 2), which may be tolerable to some extent depending on the specific application. In general, blank 6 shows good results in terms of compaction, decompaction, and induced absorption, albeit only at the relatively high energy density of 0.075 mJ/cm$^2$. The relatively high OH-content of blank 6, though it leads to an inherent tendency to show compaction, renders blank 6 particularly suitable for mixing with a blank manufactured according to the soot procedure and characterized by its especially low OH-content. This notion is confirmed by the results obtained with blank 7.

The invention claimed is:

1. A process for the manufacture of a quartz glass blank, said process comprising: manufacturing a first and a second quartz glass by flame hydrolysis of a Si-containing compound, wherein the first and second quartz glass have different OH-contents, wherein a mixed quartz glass with a mean OH-content in a range of 125 wt-ppm to 450 wt-ppm is generated by mixing the first quartz glass and the second quartz glass.

2. A process according to claim 1, wherein the manufacture of the first quartz glass with the OH-content thereof includes formation of SiO$_2$ particles and deposition of layers of said SiO$_2$ particles on a rotating carrier so as to generate a porous soot body and subsequent vitrification of the soot body, and the manufacture of the second quartz glass with the OH-content thereof being different from the OH-content of the first quartz glass includes formation of SiO$_2$ particles and deposition thereof on a rotating carrier so as to generate a vitrified preform.

3. A process according to claim 1 wherein the OH-content of the first quartz glass is in a range of 10 wt-ppm to 300 wt-ppm and the OH-content of the second quartz glass is in a range of 400 wt-ppm to 1,300 wt-ppm.

4. A process according to claim 1, wherein the mixing step includes twisting and turning of one quartz glass body of the first quartz glass and one quartz glass body of the second quartz glass.

5. A process for making a component to be used in microlithography and subjected to a number of pulses of ultraviolet radiation having a wavelength that is 250 nm or less, said process comprising:

making a quartz glass blank comprising a glass structure that is essentially free of oxygen defect sites, having an $H_2$-content in the range of $0.1\times10^{16}$ molecules/cm$^3$ to $4.0\times10^{16}$ molecules/cm$^3$, an OH-content in the range of 125 wt-ppm to 450 wt-ppm, an SiH group-content of less than $5\times10^{16}$ molecules/cm$^3$, a refractive index inhomogeneity of less than 2 ppm, and a strain birefringence of less than 2 nm/cm; and forming said component from the quartz glass blank;

wherein said quartz glass of the blank is selected such that for a predetermined pulse number P of pulses of said ultraviolet radiation, the quartz glass blank is of quartz glass with an OH-content in accordance with the following formula:

$$C_{OH}[\text{wt-ppm}]=1.7\times10^3\times\epsilon^{0.4}\pm50,$$

wherein $\epsilon$ is a given pulse energy density of said ultraviolet radiation, and $\epsilon$ is at least 0.005 mJ/cm$^2$.

6. A process according to claim 5, wherein the OH-content of the quartz glass is in accordance with the following formula:

$$C_{OH}[\text{wt-ppm}]=1.7\times10^3\times\epsilon^{0.4}\pm25.$$

7. A process according to claim 5 wherein the pulse energy density, $\epsilon$, is less than 0.1 mJ/cm$^2$.

8. A process according to claim 5 wherein the pulse energy density, $\epsilon$, is less than 0.05 mJ/cm$^2$.

9. A process according to claim 2 wherein the OH-content of the first quartz glass is in a range of 10 wt-ppm to 300 wt-ppm and the OH-content of the second quartz glass is in a range of 400 wt-ppm to 1,300 wt-ppm.

10. A process for making a component to be used in microlithography and subjected to a number of pulses of ultraviolet radiation having a wavelength that is 250 nm or less, said process comprising:

making a quartz glass blank comprising a glass structure that is essentially free of oxygen defect sites, having an H2-content in the range of $0.1\times10^{16}$ molecules/cm$^3$ to $4.0\times10^{16}$ molecules/cm$^3$, an SiH group-content of less than $5\times10^{16}$ molecules/cm$^3$, a refractive index inhomogeneity of less than 2 ppm, and a strain birefringence of less than 2 nm/cm, wherein the OH-content is in the range of 200 wt-ppm to 350 wt-ppm, and forming said component from the quartz glass blank;

wherein said quartz glass of the blank is selected such that for a predetermined pulse number P of pulses of said ultraviolet radiation, the quartz glass blank is of quartz glass with an OH-content in accordance with the following formula:

$$C_{OH}[\text{wt-ppm}]=1.7\times10^3\times\epsilon^{0.4}\pm50,$$

wherein $\epsilon$ is a given pulse energy density of said ultraviolet radiation, and $\epsilon$ is at least 0.005 mJ/cm$^2$.

11. A process for making a component to be used in microlithography and subjected to a number of pulses of ultraviolet radiation having a wavelength that is 250 nm or less, said process comprising:

making a quartz glass blank comprising a glass structure that is essentially free of oxygen defect sites, having an OH-content in the range of 125 wt-ppm to 450 wt-ppm, an SiH group-content of less than $5\times10^{16}$ molecules/cm$^3$, a refractive index inhomogeneity of less than 2 ppm, and a strain birefringence of less than 2 nm/cm, wherein the H$^2$-content is in the range of $1\times10^{16}$ molecules/cm$^3$ to $3\times10^{16}$ molecules/cm$^3$; and forming said component from the quartz glass blank;

wherein said quartz glass of the blank is selected such that for a predetermined pulse number P of pulses of said ultraviolet radiation, the quartz glass blank is of quartz glass with an OH-content in accordance with the following formula:

$$C_{OH}[\text{wt-ppm}]=1.7\times10^3\times\epsilon^{0.4}\pm50$$

wherein $\epsilon$ is a given pulse energy density of said ultraviolet radiation, and $\epsilon$ is at least 0.005 mJ/cm$^2$.

12. A process according to claim 6, wherein, for a given pulse number, P, said quartz glass has a hydrogen content that is between a minimum hydrogen content, $C_{H2min}$, and a maximum hydrogen content, $C_{H2max}$, according to the following formulas:

$$C_{H2min}[\text{molecules/cm}^3]=1.0\times10^{16}\epsilon^2 P, \text{ and}$$

$$C_{H2max}[\text{molecules/cm}^3]=2.0\times10^{18}\epsilon$$

wherein $\epsilon$ is the pulse energy density, in mJ/cm$^2$.

13. A process according to claim 7, wherein, for a given pulse number, P, said quartz glass has a hydrogen content that is between a minimum hydrogen content, $C_{H2min}$, and a maximum hydrogen content, $C_{H2max}$, according to the following formulas:

$$C_{H2min}[\text{molecules/cm}^3]=1.0\times10^6\epsilon^2 P, \text{ and}$$

$$C_{H2max}[\text{molecules/cm}^3]=2.0\times10^{18}\epsilon$$

wherein $\epsilon$ is the pulse energy density, in mJ/cm$^2$.

14. A process according to claim 8, wherein, for a given pulse number, P, said quartz glass has a hydrogen content that isbetween a minimum hydrogen content, $C_{H2min}$, and a maximum hydrogen content, $C_{H2max}$, according to the following formulas:

$$C_{H2min}[\text{molecules/cm}^3]=1.0\times10^6\epsilon^2 P, \text{ and}$$

$$C_{H2max}[\text{molecules/cm}^3]=2.0\times10^{18}\epsilon$$

wherein $\epsilon$ is the pulse energy density, in mJ/cm$^2$.

15. The process according to claim 10, wherein the $H_2$-content of the blank is in the range of $1\times10^{16}$ molecules/cm$^3$ to $3\times10^{16}$ molecules/cm$^3$.

* * * * *